(12) United States Patent
Fujimura et al.

(10) Patent No.: US 8,575,847 B2
(45) Date of Patent: Nov. 5, 2013

(54) CONTROL CIRCUIT OF LIGHT-EMITTING ELEMENT

(75) Inventors: Yoshio Fujimura, Gunma (JP); Shinichi Yamamoto, Gunma (JP); Feng Xu, Gunma (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 299 days.

(21) Appl. No.: 13/092,746

(22) Filed: Apr. 22, 2011

(65) Prior Publication Data

US 2011/0260651 A1 Oct. 27, 2011

(30) Foreign Application Priority Data

Apr. 23, 2010 (JP) ................................ 2010-100028

(51) Int. Cl.
*H05B 37/00* (2006.01)
*H05B 39/00* (2006.01)

(52) U.S. Cl.
USPC ........... 315/177; 315/219; 315/221; 315/223; 315/266

(58) Field of Classification Search
None
See application file for complete search history.

(56) References Cited

U.S. PATENT DOCUMENTS

| 6,445,598 | B1 * | 9/2002 | Yamada | 363/21.12 |
| 6,515,876 | B2 * | 2/2003 | Koike et al. | 363/21.16 |
| 7,855,520 | B2 * | 12/2010 | Leng | 315/307 |

FOREIGN PATENT DOCUMENTS

| JP | 2008-075834 A | 4/2008 |
| JP | 2009-094707 A | 4/2009 |

OTHER PUBLICATIONS esp@cenet Patent Abstract for Japanese Publication No. 2009-094707, publication date Apr. 30, 2009. (1 page).
esp@cenet Patent Abstract for Japanese Publication No. 2008-075834, publication date Apr. 3, 2008. (1 page).

* cited by examiner

*Primary Examiner* — Anh Tran
(74) *Attorney, Agent, or Firm* — Osha Liang LLP

(57) ABSTRACT

A control circuit of a light-emitting element comprises a rectifying unit (30), a switching element (38), a transformer (48) having a first winding (L1) which generates a magnetic field using a current controlled by switching of the switching element (38), a second winding (L2) which is magnetically coupled to the first winding (L1) and which generates a current flowing to an LED (102), and a third winding (L3) which is magnetically coupled to the first winding (L1) and which generates a voltage (Sfbk), and an averaging capacitor (32) which averages a voltage derived by superposing a voltage (Srec) rectified by the rectifying unit (30) and the voltage (Sfbk), and a voltage averaged by the averaging capacitor (32) is applied to the first winding (L1), so that light is emitted from the LED (102).

4 Claims, 7 Drawing Sheets

CONTROL CIRCUIT OF LIGHT-EMITTING ELEMENT

CROSS-REFERENCE TO RELATED APPLICATIONS

The entire disclosure of Japanese Patent Application No. 2010-100028 filed on Apr. 23, 2010, including specification, claims, drawings, and abstract, is incorporated hereinby reference in its entirety.

BACKGROUND

1. Technical Field

The present invention relates to a control circuit which controls a light-emitting element.

2. Background Art

Currently, in order to dim the light-emission intensity (brightness) when an incandescent lamp is used as illumination, a system is used which controls the light-emission intensity by controlling a conduction angle of an alternating current (AC) power supply and reducing an average value of a current flowing in the incandescent lamp.

On the other hand, in view of energy conservation and the like, the use of a light-emitting diode (LED) as the light-emitting element for illumination in place of the incandescent lamp is desired. When the LED is used for illumination, it is desired to apply the dimmer system for incandescent lamp which is already used in the infrastructure.

FIG. 9 shows a control circuit 100 of an illumination system in the related art. The control circuit 100 comprises a rectifying unit 10, a rectifying capacitor 12, a choke coil 14, a regenerative diode 16, a switching element 18, a reference voltage generating unit 20, and a comparator 22.

When an AC power supply is supplied to the rectifying unit 10, the AC power supply is full-wave rectified. The full-wave rectified voltage is averaged by the rectifying capacitor 12, and is supplied to an anode terminal of the LED 102 as a drive voltage. A cathode of the LED 102 is grounded through a series connection of the choke coil 14, the switching element 18, and a resistor element R1. A terminal voltage of the resistor R1 is input to an inverting input terminal of the comparator 22 as a comparative voltage Vcmp. On the other hand, the reference voltage generating unit 20 comprises a series connection of a resistor R2, a Zener diode ZD, and a resistor R3, and divides the voltage rectified by the rectifying unit 10 and inputs a reference voltage Vref to a non-inverting input terminal of the comparator 22. Based on a comparison result between the reference voltage Vref and the comparative voltage Vcmp by the comparator 22, switching of the switching element 18 is controlled, a current is supplied to the LED 102 through the choke coil 14, the switching element 18, and the resistor element R1, and light is emitted from the LED 102. Here, when the comparative voltage Vcmp is lower than the reference voltage Vref, the switching element 18 is switched ON and the current is supplied to the LED 102, and when the comparative voltage Vcmp becomes larger than the reference voltage Vref, the switching element 18 is switched OFF and the current to the LED 102 is stopped. In this manner, the current flowing to the LED 102 is controlled, and the average light-emission intensity of the LED 102 can be controlled. In addition, the regenerative diode 16 which regenerates the energy stored in the choke coil 14 to the LED 102 when the switching element 18 is switched OFF is provided in parallel to the LED 102 and the choke coil 14.

In the dimmer circuit for the incandescent lamp or the like, the light is dimmed by adjusting a duty cycle of the applied AC voltage, and consequently, current flowing in the incandescent lamp, by controlling a conduction angle of the AC power supply. When the dimmer circuit is applied to a resistive element such as the incandescent lamp, as shown by a dotted line in FIG. 10, the voltage and the current are output in a stable state in approximately the same phase. When the control circuit 100 as described above is applied to such a dimmer circuit, as shown by a solid line in FIG. 10, the input current I in of the control circuit 100 rises with the rise of an input voltage Vin of the control circuit 100, but the input current I in may then be reduced, and an unstable state may be reached where the switching element 18 is repetitively switched ON and OFF.

SUMMARY

According to one aspect of the present invention, there is provided a control circuit of a light-emitting element, comprising a rectifying unit which full-wave rectifies an alternating current power supply, a switching element, a feedback voltage generating unit comprising a transformer having a first winding which generates a magnetic field using a current controlled by switching of the switching element, a second winding which is magnetically coupled to the first winding and which generates a current flowing to the light-emitting element, and a third winding which is magnetically coupled to the first winding and which generates a feedback voltage, a reference voltage generating unit which divides a voltage rectified by the rectifying unit and generates a reference voltage, a comparator which compares a comparative voltage corresponding to a current flowing to the first winding and the reference voltage and outputs a control signal which controls the switching of the switching element according to a comparison result, and an averaging capacitor which averages a voltage derived by superposing the voltage rectified by the rectifying unit and the feedback voltage, wherein a voltage averaged by the averaging capacitor is applied to the first winding, so that light is emitted from the light-emitting element.

According to another aspect of the present invention, there is provided a control circuit of a light-emitting element, comprising a rectifying unit which full-wave rectifies an alternating current power supply, a switching element which switches a current flowing to the light-emitting element, a feedback voltage generating unit comprising a transformer having a first winding which generates a magnetic field using the current flowing to the light-emitting element, and a second winding which is magnetically coupled to the first winding and which generates a feedback voltage, a reference voltage generating unit which divides a voltage rectified by the rectifying unit and generates a reference voltage, a comparator which compares a comparative voltage corresponding to the current flowing to the light-emitting element and the reference voltage and outputs a control signal which controls the switching of the switching element according to a comparison result, and an averaging capacitor which averages a voltage derived by superposng the voltage rectified by the rectifying unit and the feedback voltage, wherein a voltage averaged by the averaging capacitor is applied to the light-emitting element, so that light is emitted from the light-emitting element.

According to another aspect of the present invention, there is provided a control circuit of a light-emitting element, comprising a rectifying unit which full-wave rectifies an alternating current power supply, a first switching element which switches a current flowing to the light-emitting element, a reference voltage generating unit which divides a voltage rectified by the rectifying unit and generates a reference voltage, a comparator which compares a comparative voltage corresponding to the current flowing to the light-emitting element and the reference voltage and outputs a control signal which controls the switching of the first switching element according to a comparison result, a step-up unit which generates a step-up voltage by controlling a second switching element with the control signal and changing a current flowing to a circuit including a capacitor and an inductor which receive the voltage rectified by the rectifying unit, and an averaging capacitor which averages a voltage derived by superposing the voltage rectified by the rectifying unit and the step-up voltage, wherein a voltage averaged by the averaging capacitor is applied to the light-emitting element, so that light is emitted from the light-emitting element.

According to another aspect of the present invention, there is provided a control circuit of a light-emitting element, comprising a rectifying unit which full-wave rectifies an alternating current power supply, a first switching element which switches a current flowing to the light-emitting element, a reference voltage generating unit which divides a voltage rectified by the rectifying unit and generates a reference voltage, a comparator which compares a comparative voltage corresponding to the current flowing to the light-emitting element and the reference voltage and controls the switching of the first switching element according to a comparison result, a step-up unit which generates a step-up voltage by receiving the voltage rectified by the rectifying unit and changing, with a second switching element, a current flowing to a circuit including a capacitor and an inductor, wherein the current flowing to the circuit including the capacitor and the inductor is changed by controlling the second switching element according to the step-up voltage, and an averaging capacitor which averages a voltage derived by superposing the voltage rectified by the rectifying unit and the step-up voltage, wherein a voltage averaged by the averaging capacitor is applied to the light-emitting element, so that light is emitted from the light-emitting element.

BRIEF DESCRIPTION OF THE DRAWINGS

Preferred embodiments of the present invention will be described in further detail based on the following drawings, wherein.

DESCRIPTION OF EMBODIMENT

<First Preferred Embodiment>

Figure 1:
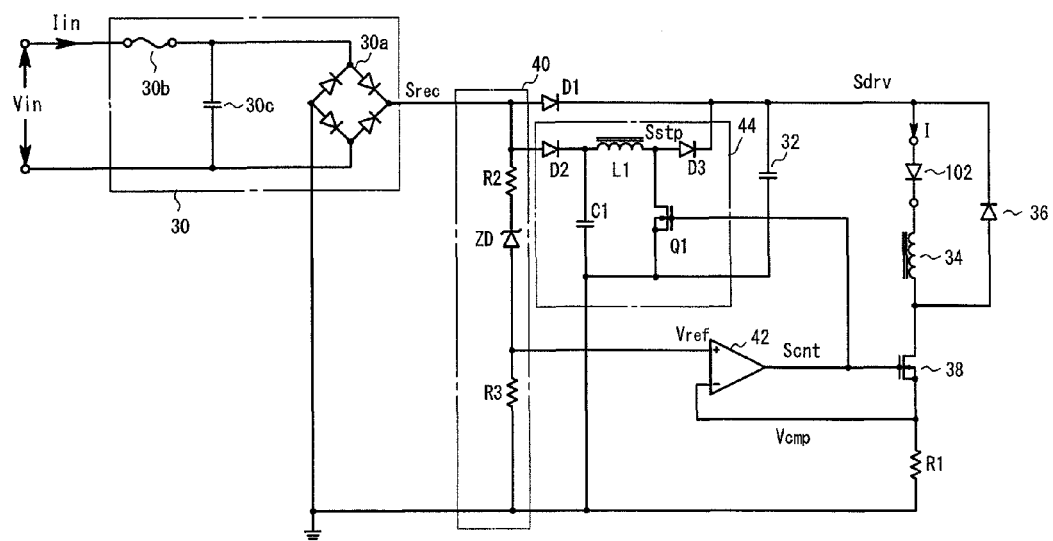
FIG. 1 is a diagram showing a structure of a control circuit of a light-emitting element according to a first preferred embodiment of the present invention.
Figure 2:
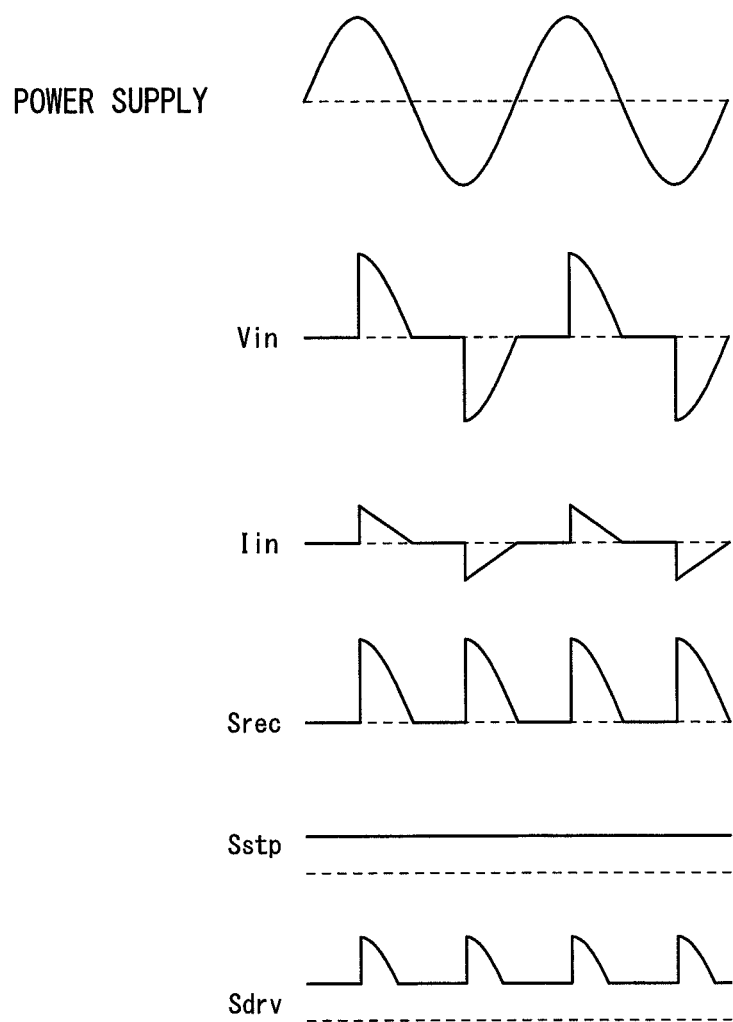
FIG. 2 is a diagram showing an operation of the control circuit of the light-emitting element according to the first preferred embodiment of the present invention.

As shown in FIG. 1, a control circuit 200 of a light-emitting element according to a first preferred embodiment of the present invention comprises a rectifying unit 30, an averaging capacitor 32, a choke coil 34, a regenerative diode 36, a switching element 38, a reference voltage generating unit 40, a comparator 42, and a step-up unit 44. FIG. 2 is a diagram showing an example of a change with respect to time of signals of the sections of the control circuit 200.

The control circuit 200 controls light emission of the light-emitting element. For example, the control circuit 200 is connected to a light-emitting diode (LED) 102 for illumination, and controls a current to the LED 102. In addition, the control circuit 200 is used connected to the dimmer circuit which controls the conduction angle of the AC power supply used in a dimmer system of an incandescent lamp. The dimmer circuit is connected to the rectifying unit 30 of the control circuit 200. That is, the dimmer circuit receives an AC power supply, adjusts the conduction angle of the AC power supply according to an adjustment signal such as the dimmer volume, and inputs an adjusted AC voltage Vin to the control circuit 200.

The rectifying unit 30 comprises a rectifying bridge circuit 30a. The rectifying unit 30 receives the adjusted AC voltage Vin, full-wave rectifies the adjusted AC voltage Vin, and outputs as a full-wave rectified voltage Srec. As shown in FIG. 1, a fuse 30b for protection and a filter 30c for noise removal may be provided in the rectifying unit 30.

On the downstream side of the rectifying unit 30, an anode terminal of the LED 102 is connected through a parallel connection section of a diode D1 and the step-up unit 44. The averaging capacitor 32 is also connected to the anode terminal of the LED 102. A cathode terminal of the LED 102 is grounded through the choke coil 34, the switching element 38, and a voltage detecting resistor R1. A voltage derived by superposing the full-wave rectified voltage Srec and a step-up voltage Sstep which is output from the step-up unit 44 is applied to the LED 102 as a drive voltage Sdrv.

The choke coil 34 is provided in order to make the current flowing through the LED 102 and the switching element 38 intermittent.

The regenerative diode 36 is a flywheel diode, and is connected in parallel with the LED 102 and the choke coil 34. The regenerative diode 36 regenerates the energy stored in the choke coil 34 to the LED 102 when the switching element 38 is disconnected.

The switching element 38 is provided for supplying or stopping the current to the LED 102. The switching element 38 is an element having a capacity corresponding to a power consumption of the LED 102, and, for example, a large-power electric field effect transistor (MOSFET) or the like is used. The switching of the switching element 38 is controlled by a control signal Scnt of the comparator 42.

The reference voltage generating unit 40 comprises a series connection of a resistor R2, a Zener diode ZD, and a resistor R3. The reference voltage generating unit 40 divides the full-wave rectified voltage Srec rectified by the rectifying unit 10 to generate a reference voltage Vref, and inputs the reference voltage Vref to a non-inverted input terminal of the comparator 22. Because of the reference voltage generating unit 40, the reference voltage Vref shows a change which is proportional to the change of the full-wave rectified voltage Srec. For a certain input AC voltage Vin, there is a possibility that the reference voltage Vref will become too high. Therefore, it is desirable to provide, in the reference voltage generating unit 40, the Zener diode ZD for clamping the reference voltage Vref to a voltage less than or equal to a predetermined voltage Vmax.

The comparator 42 receives a terminal voltage of the voltage detecting resistor R1 due to the current flowing through the LED 102, as a comparative voltage Vcmp at an inverting input terminal. In addition, the comparator 42 receives the reference voltage Vref generateed by the reference voltage generating unit 40 at the non-inverting input terminal. The comparator 42 compares the comparative voltage Vcmp and the reference voltage Vref, and outputs the control signal Scnt corresponding to a difference between the comparative voltage Vcmp and the reference voltage Vref. The comparator 42 outputs the control signal Scnt such that the current flowing through the switching element 38 becomes smaller as the comparative voltage Vcmp becomes lower compared to the reference voltage Vref. In addition, the comparator 42 outputs the control signal Scnt such that the current flowing through the switching element 38 becomes larger as the comparative voltage Vcmp becomes larger compared to the reference voltage Vref.

The step-up unit 44 applies the full-wave rectified voltage Srec to a capacitor C1 and an inductor L1 through the diode D2. A transistor Q1 is controlled according to the control signal Scnt, and the step-up voltage Sstp is output to the anode terminal of the LED 102 through a diode D3. In a state where the current flowing through the switching element 38 is increased by the control signal Scnt, the current flowing through the transistor Q1 is also increased, and in a state where the current flowing through the switching element 38 is reduced by the control signal Scnt, the current flowing through the transistor Q1 is also reduced. With such a control, the step-up voltage Sstp is stabilized.

The switching element 38 is turned ON until the comparative voltage Vcmp is increased to the reference voltage Vref, and when the comparative voltage Vcmp exceeds the reference voltage Vref, the switching element 38 is switched OFF, and these states are repeated. In this manner, it is possible to supply a current I corresponding to the full-wave rectified voltage Srec without exceeding the rated current of the LED 102. Therefore, light can be emitted from the LED 102 at an intensity corresponding to the drive voltage Sdry reflecting the average value of the input voltage Vin generateed by adjusting the conduction angle of the AC power supply.

On the other hand, as shown in FIG. 2, the drive voltage Sdry derived by superposing the full-wave rectified voltage Srec and the step-up voltage Sstp is applied to the LED 102, and thus the voltage applied to the LED 102 will not be reduced to a voltage near 0 V. With this configuration, the switching control of the switching element 38 is stabilized. In addition, as shown in FIG. 2, the current I in flowing into the control circuit 200 is proportional to a length of time for which the drive voltage Sdry is applied to the LED 102, and the conduction angle is widened. With this configuration, a power factor at the control circuit 200 can be improved.

<Second Preferred Embodiment>

Figure 3:
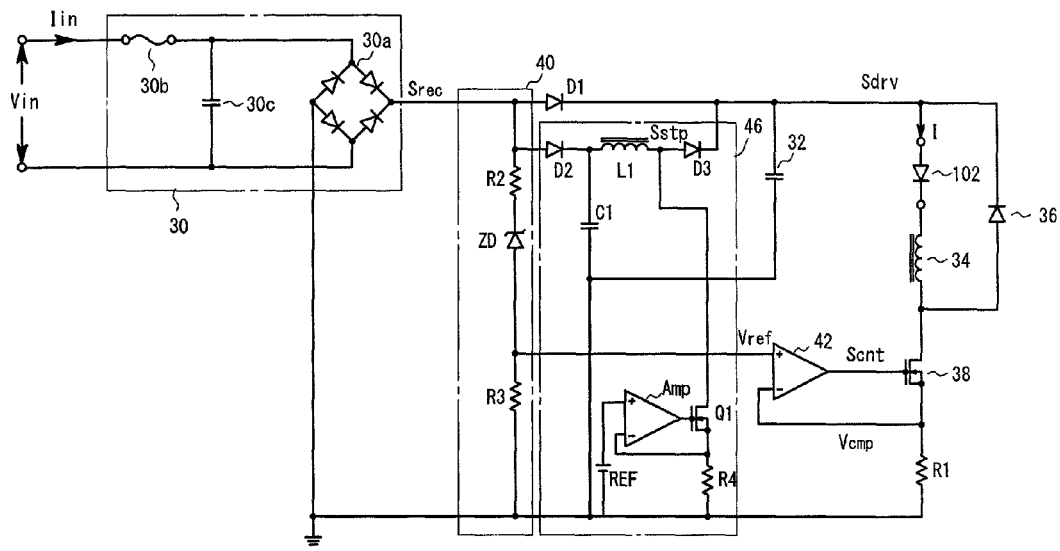
FIG. 3 is a diagram showing a structure of a control circuit of a light-emitting element according to a second preferred embodiment of the present invention.

As shown in FIG. 3, a control circuit 300 of a light-emitting element in a second preferred embodiment of the present invention comprises the rectifying unit 30, the averaging capacitor 32, the choke coil 34, the regenerative diode 36, the switching element 38, the reference voltage generating unit 40, the comparator 42, and a step-up unit 46.

The control circuit 300 is a circuit in which the step-up unit 46 is provided in place of the step-up unit 44 of the control circuit 200 in the first preferred embodiment of the present invention. Therefore, the structure of the control circuit 300 other than the step-up unit 46 will not be described again.

The step-up unit 46 applies the full-wave rectified voltage Srec to the capacitor C1 and the inductor L1 through the diode D2. In addition, the step-up unit 46 comprises a comparator Amp in which a terminal voltage generated in a resistor R4 corresponding to a current flowing through the transistor Q1 is input to an inverting input terminal and the reference voltage REF is input to a non-inverting input terminal. The comparator Amp applies a control such that the current flowing through the transistor Q1 becomes lower as the terminal voltage of the resistor R4 becomes larger compared to the reference voltage REF, and the current flowing through the transistor Q1 becomes larger as the terminal voltage of the resistor R4 becomes lower compared to the reference voltage REF. That is, the transistor Q1 is self-oscillated according to the current flowing through the transistor Q1. A step-up voltage Sstp obtained by the control of the transistor Q1 is applied to the anode terminal of the LED 102 through the diode D3. With such a control, the step-up voltage Sstp is stabilized.

In this manner, with the control circuit 300, similar to the control circuit 200 in the first preferred embodiment of the present invention, light can be emitted from the LED 102 with an intensity corresponding to the drive voltage Sdry reflecting the average value of the input voltage Vin obtained by adjusting the conduction angle of the AC power supply. In this process, the voltage applied to the LED 102 is not reduced to a value near 0 V. Therefore, the switching control of the switching element 38 is stabilized. In addition, similar to FIG. 2, the current I in flowing into the control circuit 300 is proportional to the length of time for which the drive voltage Sdry is applied to the LED 102, and the conduction angle is widened. In this manner, the power factor can also be improved in the control circuit 300.

Moreover, the current flowing to the transistor Q1 needs to be in a range to enable stable switching operation of the control circuit 300, and can be reduced compared to the current flowing to the transistor Q1 in the first preferred embodiment of the present invention. With this configuration, power consumption in the control circuit 300 can be reduced.

Alternatively, a circuit may be provided which stops the operation of the transistor Q1 when the voltage Vin is not input from the dimmer. With this configuration, the power consumption can be further reduced at the control circuit 300.

<Third Preferred Embodiment>

Figure 4:
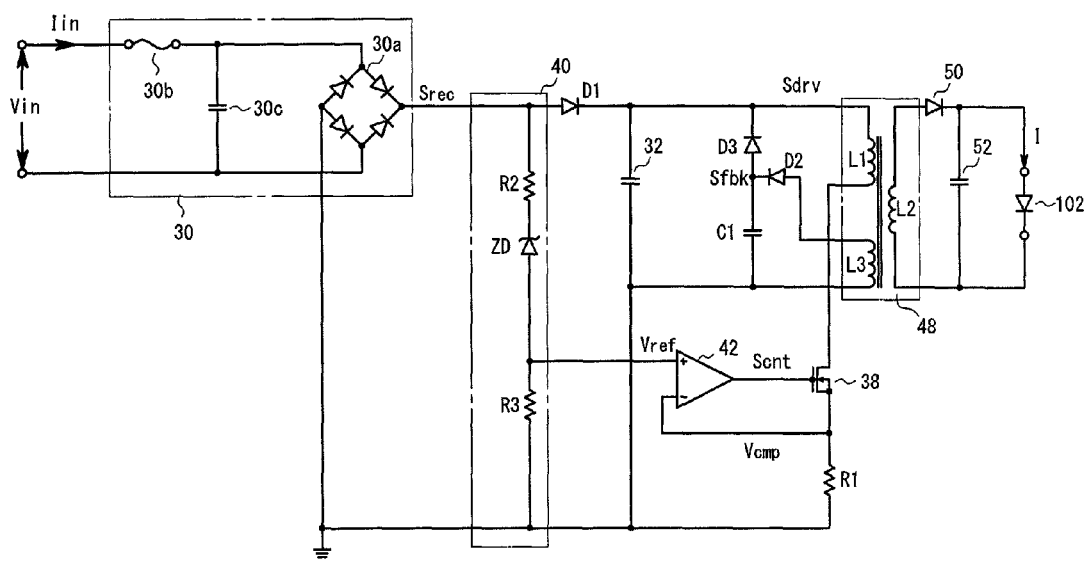
FIG. 4 is a diagram showing a structure of a control circuit of a light-emitting element according to a third preferred embodiment of the present invention.
Figure 5:
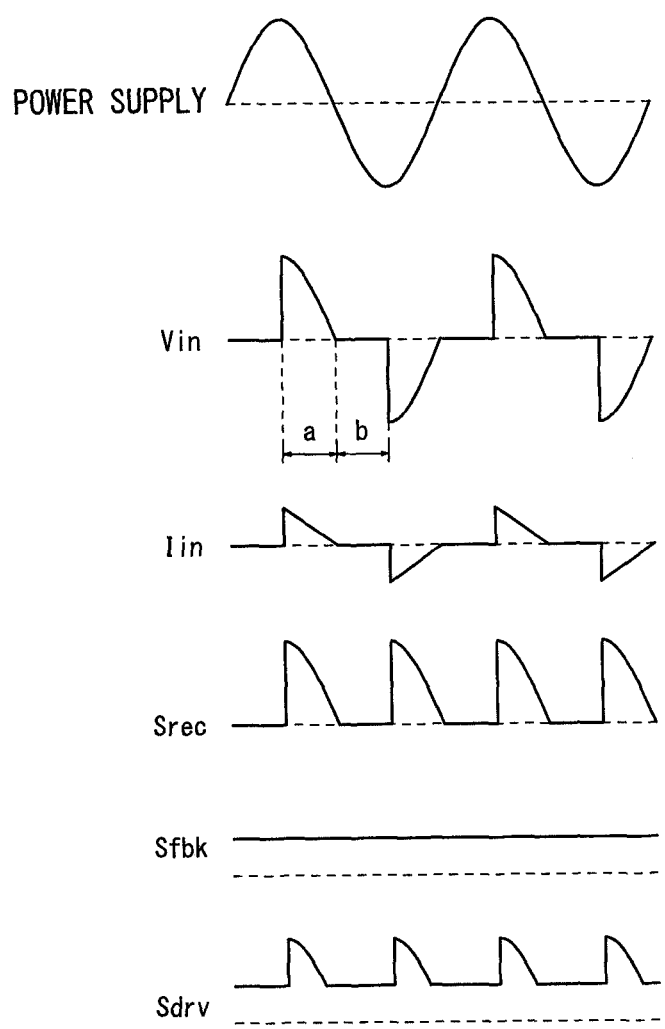
FIG. 5 is a diagram showing an operation of the control circuit of the light-emitting element according to the third preferred embodiment of the present invention.

As shown in FIG. 4, a control circuit 400 of a light-emitting element in a third preferred embodiment of the present invention comprises the rectifying unit 30, the averaging capacitor 32, the switching element 38, the reference voltage generating unit 40, the comparator 42, a transformer 48, a secondary side diode 50, and a secondary side capacitor 52. FIG. 5 is a diagram showing an example of a change with respect to time of each signal of each section of the control circuit 400.

The control circuit 400 is a circuit in which a transformer 48 and a feedback voltage generating circuit from the transformer 48 are provided in place of the step-up unit 44 of the control circuit 200 of the first preferred embodiment of the present invention. Therefore, structures similar to those of the control circuit 200 in the first preferred embodiment of the present invention will not be described again.

A cathode of a diode D1 is connected to one terminal of a primary winding L1 of the transformer 48. The other terminal of the primary winding L1 of the transformer 48 is grounded through the switching element 38 and the resistor R1. A cathode of the diode D1 is grounded through the averaging capacitor 32.

In the transformer 48, an electromagnetic coupling is formed between the primary winding L1 and a secondary winding L2, a change of a voltage applied between the terminals of the primary winding L1 is converted into a voltage which is output between terminals of the secondary winding L2, and the converted voltage is output.

An anode of the secondary side diode 50 is connected to one terminal of the secondary winding L2 of the transformer 48. The anode of the LED 102 which is the light-emitting element is connected to a cathode of the secondary side diode 50. The cathode of the LED 102 is connected to the other terminal of the secondary winding L2 of the transformer 48. The secondary side capacitor 52 is connected in parallel with the secondary winding L2 of the transformer 48.

In addition, in the transformer 48, an electromagnetic coupling is formed between the primary winding L1 and a feedback winding L3, a change of a voltage applied between the terminals of the primary winding L1 is converted into a voltage which is output between terminals of the feedback winding L3, and the converted voltage is output. An output voltage Sfbk (feedback voltage) of the feedback winding L3 is fed back to the primary winding L1 through feedback diodes D2 and D3. In addition, in order to stabilize the output voltage Sfbk, a capacitor C1 may be provided. A voltage derived by superposing the output voltage Sfbk and the full-wave rectified voltage Srec is applied to the primary winding L1 of the transformer 48 as the drive voltage Sdrv.

The switching element 38 is turned ON until the comparative voltage Vcmp is increased to the reference voltage Vref, and is switched OFF when the comparative voltage Vcmp exceeds the reference voltage Vref, and these states are repeated. In this manner, it is possible to supply a current I corresponding to the full-wave rectifying voltage Srec without exceeding the rated current of the LED 102. Therefore, light can be emitted from the LED 102 with an intensity corresponding to the drive voltage Sdry reflecting the average value of the input voltage Vin obtained by adjusting the conduction angle of the AC power supply.

Moreover, as shown in FIG. 5, the drive voltage Sdry derived by superposing the full-wave rectified voltage Srec and the output voltage Sfbk is applied, and the voltage applied to the LED 102 through the transformer 48 is not reduced to a voltage near 0 V. With this configuration, the switching control of the switching element 38 is stabilized. Furthermore, as shown in FIG. 5, the current I in flowing into the control circuit 400 is proportional to the length of time the drive voltage Sdry is applied to the LED 102, and the conduction angle is widened. With this configuration, the power factor in the control circuit 400 can be improved.

Figure 6:
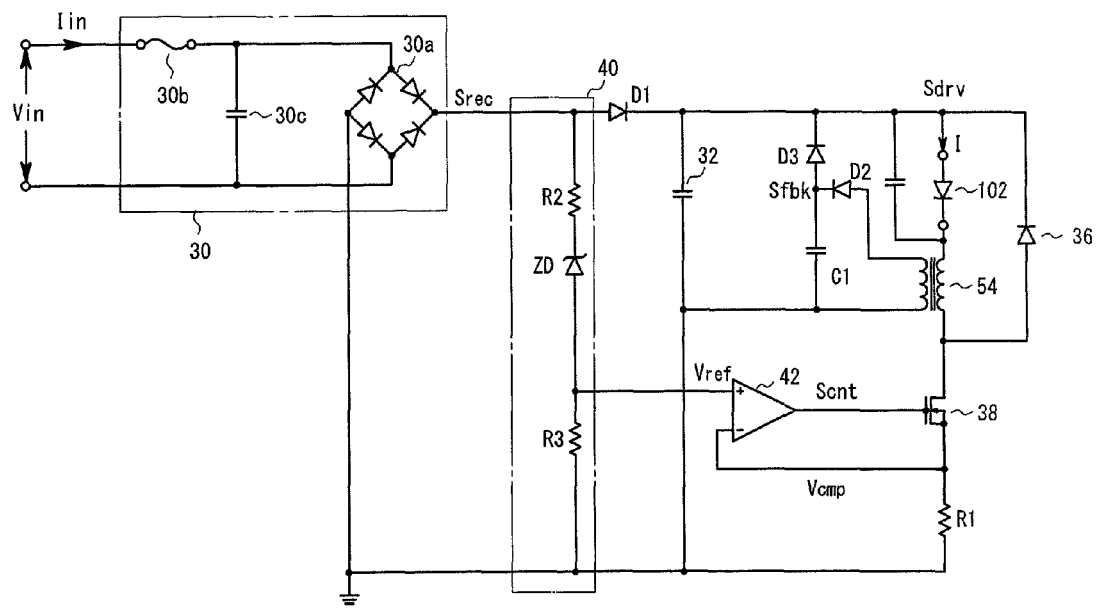
FIG. 6 is a diagram showing another structure of the control circuit of the light-emitting element according to the third preferred embodiment of the present invention.

In the control circuit 400, a configuration is employed in which the transformer 48 is provided such that the side of the primary winding L1 and the side of the secondary winding L2 of the transformer 48 are magnetically coupled, and electrically insulated. Alternatively, a structure may be employed in which the windings are not electrically insulated such as in a control circuit 402 shown in FIG. 6. In the control circuit 402, a configuration may be employed in which the current is supplied to the LED 102 without passing through the magnetic coupling, the current is controlled by the switching element 38, the current flowing to the LED 102 flows through a transformer 54, the voltage Sfbk generated in a secondary winding of the transformer 54 is superposed with the full-wave rectified voltage Srec to obtain the drive voltage Sdrv, and the drive voltage Sdry is applied to the LED 102.

With such a control circuit 402 also, similar to the control circuit 400, the voltage applied to the LED 102 is not reduced to a voltage near 0 V. With this configuration, the switching control of the switching element 38 can be stabilized. In addition, similar to FIG. 5, the current I in flowing into the control circuit 402 is proportional to the length of time the drive voltage Sdry is applied to the LED 102, and the conduction angle is widened. With this configuration, the power factor can also be improved in the control circuit 402.

Figure 7:
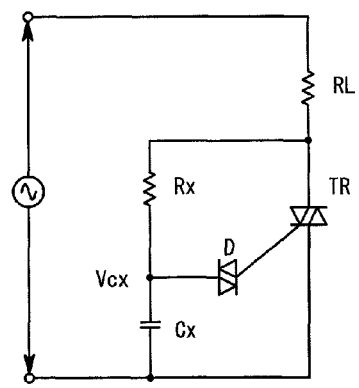
FIG. 7 is a diagram showing an example circuit structure of a dimmer.

As shown in FIG. 7, the dimmer comprises a circuit including a triac TR. The dimmer functions to switch the triac TR ON when a terminal voltage Vcx of a capacitor Cx becomes greater than or equal to a certain voltage. In order to reduce the light-emission intensity of the light-emitting element, the dimmer may be set with the resistance value of a resistor Rx increased and the time required for charging the capacitor Cx elongated, so that the terminal voltage Vcx does not tend to increase. In order to increase the light-emission intensity, the dimmer may be set with the resistance value of the resistor Rx reduced and the time required for charging the capacitor Cx shortened, so that the terminal voltage Vcx is rapidly increased. In other words, a region a of the input voltage Vin of FIG. 5 is a period where the triac TR of the dimmer is maintained in the ON state, and a region b of the input voltage Vin is a period in which the charge charged to the capacitor Cx included in the circuit is extracted.

When the light-emission intensity of the light-emitting element is reduced by the dimmer, the resistance value of the resistor Rx is enlarged, and the charge charged to the capacitor Cx does not tend to be discharged through the resistor Rx during the period when the triac TR is not in the ON state. Because of this, a voltage of the next cycle of the AC power supply would be added before the terminal voltage Vcx of the capacitor Cx is sufficiently reduced, and the operation of the triac TR may become unstable, which may cause flicker of the light-emitting element.

Figure 8:
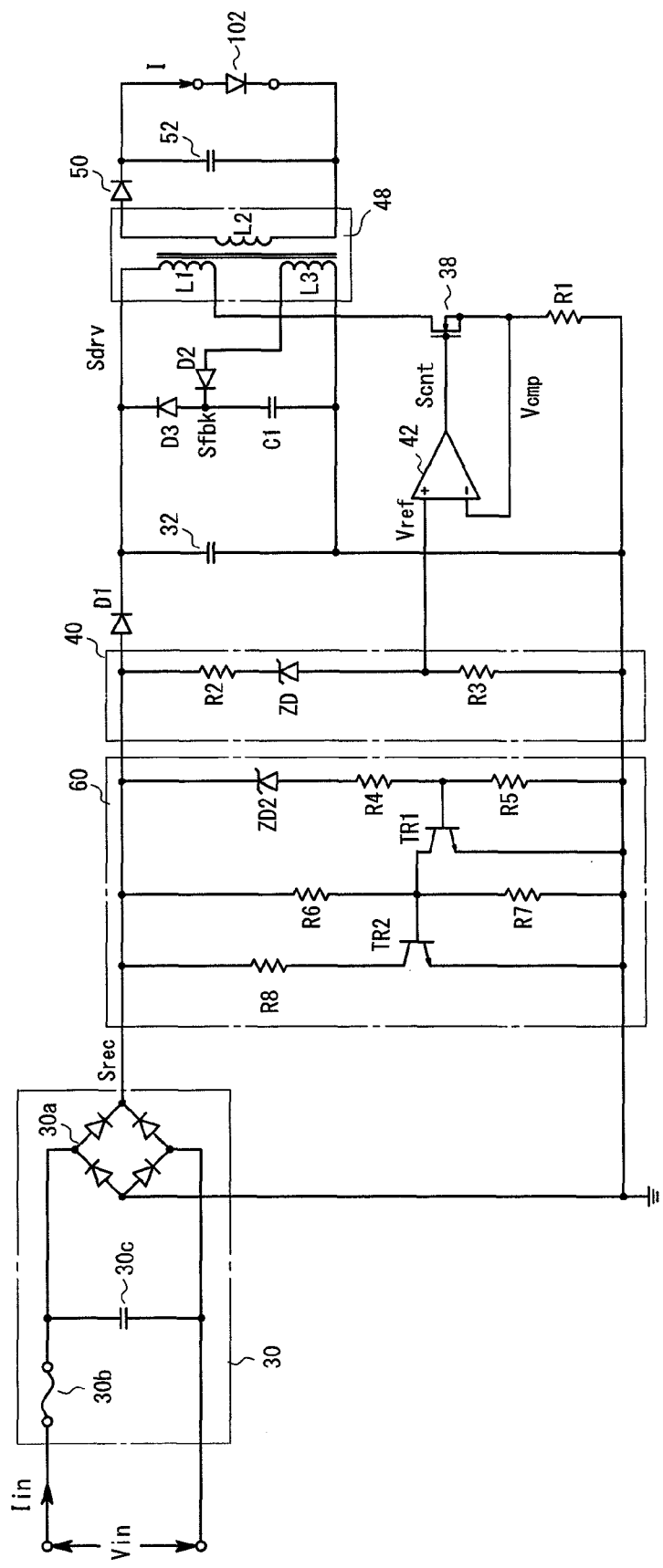
FIG. 8 is a diagram showing a structure of a control circuit of a light-emitting element having an extraction circuit.
Figure 9:
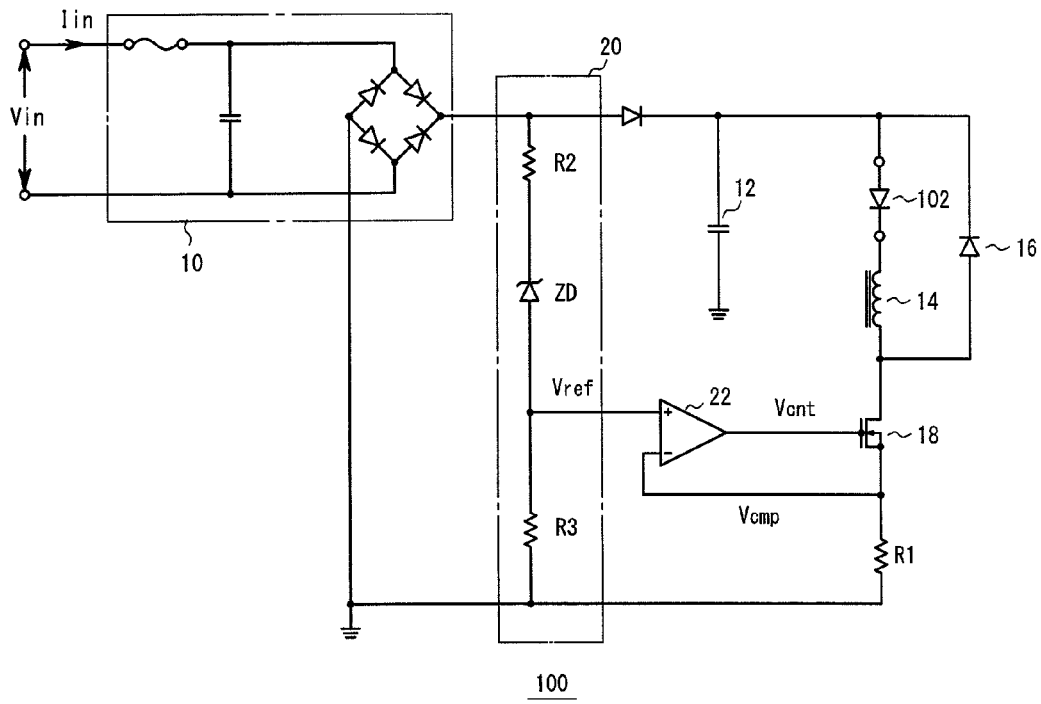
FIG. 9 is a diagram showing a structure of a control circuit of light emission of an LED in related art.
Figure 10:
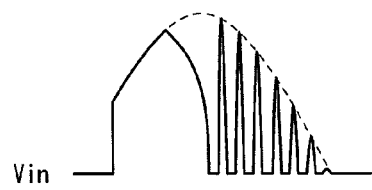
FIG. 10 is a diagram showing an operation of the control circuit of the light-emitting element in the related art.
Figure 10:

Therefore, as shown in FIG. 8, it is preferable to provide, in the control circuit 400, an extraction circuit 60 for extracting the charge in the capacitor Cx of the dimmer and reducing the terminal voltage Vcx. The extraction circuit 60 comprises a Zener diode ZD2, with the Zener voltage set to a voltage corresponding to a direct current component (corresponding to the voltage Sfbk) of the voltage Srec rectified by the rectifying unit 30. When the voltage Srec exceeds the Zener voltage, transistors TR1 and TR2 are set to the ON state. In this manner, the charge stored in the capacitor Cx of the dimmer can be extracted through a resistor R8 of the extraction circuit at the time when the triac TR is in the OFF state, the operation of the triac TR does not become unstable, and the flicker of the light-emitting element can be inhibited.

The application of the extraction circuit 60 is not limited to the control circuit 400, and the extraction circuit 60 may be similarly applied to the above-described control circuits 200, 300, and 402.

What is claimed is:

1. A control circuit of a light-emitting element, comprising:
a rectifying unit which full-wave rectifies an alternating current power supply;
a switching element;
a feedback voltage generating unit comprising a transformer having a first winding which generates a magnetic field using a current controlled by switching of the switching element, a second winding which is magnetically coupled to the first winding and which generates a current flowing to the light-emitting element, and a third winding which is magnetically coupled to the first winding and which generates a feedback voltage;

a reference voltage generating unit which divides a voltage rectified by the rectifying unit and generates a reference voltage;

a comparator which compares a comparative voltage corresponding to a current flowing to the first winding and the reference voltage and outputs a control signal which controls the switching of the switching element according to a comparison result; and an averaging capacitor which averages a voltage derived by superposing the voltage rectified by the rectifying unit and the feedback voltage, wherein a voltage averaged by the averaging capacitor is applied to the first winding, so that light is emitted from the light-emitting element.

2. A control circuit of a light-emitting element, comprising:

a rectifying unit which full-wave rectifies an alternating current power supply;

a switching element which switches a current flowing to the light-emitting element;

a feedback voltage generating unit comprising a transformer having a first winding which generates a magnetic field using the current flowing to the light-emitting element, and a second winding which is magnetically coupled to the first winding and which generates a feedback voltage;

a reference voltage generating unit which divides a voltage rectified by the rectifying unit and generates a reference voltage;

a comparator which compares a comparative voltage corresponding to the current flowing to the light-emitting element and the reference voltage and outputs a control signal which controls the switching of the switching element according to a comparison result; and an averaging capacitor which averages a voltage derived by superposing the voltage rectified by the rectifying unit and the feedback voltage, wherein a voltage averaged by the averaging capacitor is applied to the light-emitting element, so that light is emitted from the light-emitting element.

3. The control circuit of the light-emitting element according to claim 1, further comprising an extraction circuit which extracts charge from a dimmer including a triac which adjusts a conduction angle of the alternating current power supply.

4. The control circuit of the light-emitting element according to claim 2, further comprising an extraction circuit which extracts charge from a dimmer including a triac which adjusts a conduction angle of the alternating current power supply.

* * * * *